(12) United States Patent
Delco et al.

(10) Patent No.: US 8,634,877 B2
(45) Date of Patent: Jan. 21, 2014

(54) AUTOMATIC ESCALATION/DEGRADATION OF NOTIFICATIONS OF REPETITIVE CALLS

(75) Inventors: Fallon M. Delco, Austin, TX (US); Donna L. Johnson, Pflugerville, TX (US); Manjunath N. Mangalur, Bangalore (IN); Brian L. Singletary, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/441,964

(22) Filed: Apr. 9, 2012

(65) Prior Publication Data

US 2013/0267280 A1 Oct. 10, 2013

(51) Int. Cl.
*H04B 1/38* (2006.01)
*H04M 1/00* (2006.01)

(52) U.S. Cl.
USPC ......................................... 455/567; 455/417

(58) Field of Classification Search
USPC ........... 455/567, 412.1, 412.2, 415, 417, 566, 455/550.1, 575.1, 90.3
See application file for complete search history.

(56) References Cited

U.S. PATENT DOCUMENTS

| | | | |
|---|---|---|---|
| 5,870,684 A * | 2/1999 | Hoashi et al. | 455/567 |
| 6,970,692 B2 | 11/2005 | Tysor | |
| 6,993,364 B2 * | 1/2006 | Sierawski et al. | 455/567 |
| 7,092,743 B2 | 8/2006 | Vegh | |
| 7,257,200 B2 * | 8/2007 | Valeriano et al. | 379/88.12 |
| 7,590,232 B2 * | 9/2009 | Carter et al. | 379/209.01 |
| 7,734,033 B2 | 6/2010 | Aupperle et al. | |
| 2002/0068615 A1 | 6/2002 | Yamada | |
| 2003/0003966 A1 * | 1/2003 | Ranta | 455/567 |
| 2004/0253992 A1 * | 12/2004 | Huang | 455/567 |
| 2006/0088153 A1 * | 4/2006 | Wille | 379/373.01 |
| 2006/0147014 A1 | 7/2006 | Smith et al. | |
| 2007/0298758 A1 * | 12/2007 | Verma et al. | 455/404.1 |
| 2008/0039068 A1 | 2/2008 | Wang | |
| 2009/0312067 A1 * | 12/2009 | Ahlin | 455/567 |
| 2011/0045803 A1 | 2/2011 | Kim et al. | |
| 2012/0315881 A1 * | 12/2012 | Woloshyn | 455/412.2 |

FOREIGN PATENT DOCUMENTS

| | | |
|---|---|---|
| CN | 1501732 A | 6/2004 |
| JP | 03104362 A | 5/1991 |

OTHER PUBLICATIONS

AliciaB, "Hello iPhone, iOS 6 calling!", iSource, http://isource.com/2012/06/12/hello-iphone-ios-6-calling, posted on Jun. 12, 2012, 3 pages.

* cited by examiner

*Primary Examiner* — Pablo Tran
(74) *Attorney, Agent, or Firm* — Francis Lammes; Stephen J. Walder, Jr.; Libby Z. Toub

(57) ABSTRACT

Mechanisms for modifying a notification mode for notifying a user of an incoming communication is provided. In a first communication device, an incoming communication from a second communication device is received. A total number of received incoming communications from the second communication device within a predetermined period of time is determined and compared to a first threshold. In response to the total number of received incoming communications from the second communication device within the predetermined period of time meeting or exceeding the first predetermined threshold, a notification mode of the first communication device is modified to be different from a current default notification mode of the first communication device for incoming communications from the second communication device. A notification of the incoming communication from the second communication device is generated using the modified notification mode of the first communication device.

25 Claims, 3 Drawing Sheets

AUTOMATIC ESCALATION/DEGRADATION OF NOTIFICATIONS OF REPETITIVE CALLS

BACKGROUND

The present application relates generally to an improved data processing apparatus and method and more specifically to mechanisms for automatic escalation/degradation of notifications of repetitive calls.

Wireless communication devices are quickly becoming the dominant mechanism of communication between people in today's society. As a result, when one person is attempting to contact another person to initiate a communication, they often will try to contact that person on their wireless communication device. However, due the mobile nature of wireless communication devices, individuals often carry mobile devices with them into areas where communication is either not wanted or is inappropriate. As a result, individuals often place their wireless communication devices into a mode of operation where communications are either blocked, notifications of incoming communications are inhibited, or the mobile device is placed in a mode where such notifications are not audible or are not as easily discernible to the individual carrying the wireless communication device.

SUMMARY

In one illustrative embodiment, a method, in a communication device comprising a processor and a memory, for modifying a notification mode for notifying a user of an incoming communication is provided. The method comprises receiving, in a first communication device, an incoming communication from a second communication device. The method further comprises determining whether a total number of received incoming communications from the second communication device within a predetermined period of time meets or exceeds a first predetermined threshold. Moreover, the method comprises, in response to the total number of received incoming communications from the second communication device within the predetermined period of time meeting or exceeding the first predetermined threshold, modifying a notification mode of the first communication device to be different from a current default notification mode of the first communication device for incoming communications from the second communication device. In addition, the method comprises outputting a notification of the incoming communication from the second communication device using the modified notification mode of the first communication device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
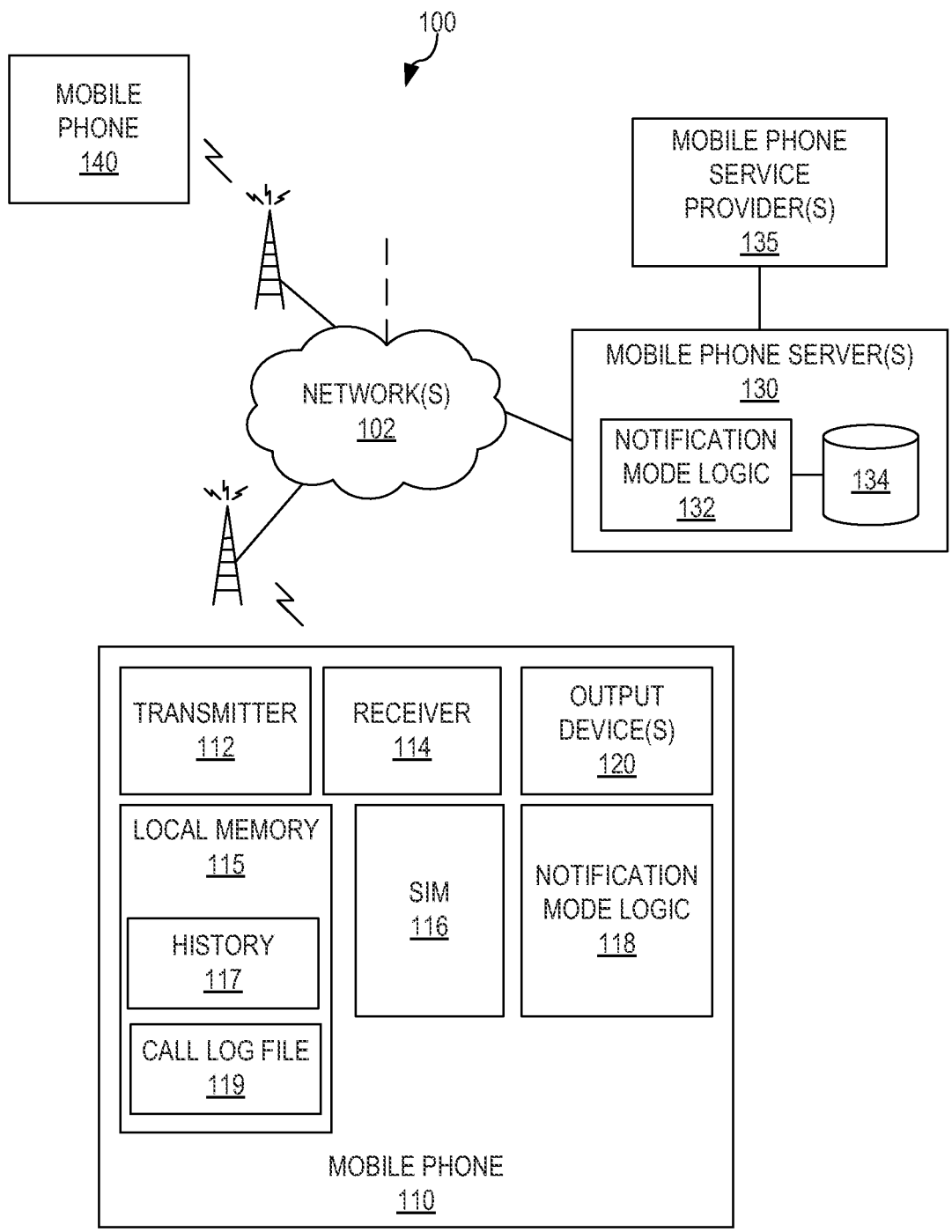
FIG. 1 is an example diagram of a mobile telephone system in which aspects of the illustrative embodiments may be implemented.

The illustrative embodiments provide a mechanism for automatic escalation/degradation of notifications of repetitive calls. As noted above, there are many mechanisms known in the art for customizing the functionality of mobile (wireless) communication devices, such as mobile telephones, personal digital assistants (PDAs), tablet computing devices, or the like. While these mechanisms may provide different ways of performing various functions, such as blocking incoming calls, forwarding incoming calls, re-routing incoming calls, etc., as recognized by the present inventors, there are no mechanisms known in the art for escalating/degrading notification modes based on a frequency of calling behavior of a caller.

For example, a user may place their mobile phone into a silent mode of operation, such as when the user is in an area where the user does not wish to be contacted or where audible notifications of incoming communications is inappropriate or otherwise distracting, such as during a business meeting, in a movie theatre, in a hospital or school zone, or the like. It should be appreciated that, while the user may wish to not receive audible notifications when the mobile phone is placed in the silent mode of operation, situations may arise where it is important for the user of the mobile phone to be contacted, e.g., an emergency situation with a family member, a business communication requiring immediate attention, a security company calling to report an alarm condition, or the like.

Currently, the only known mechanisms for overriding the current operational state of a mobile device is to establish a white list of callers that are able to specifically request overriding of the current state of the mobile device. For example, in U.S. Pat. No. 7,734,033, assigned to the same assignee as the present application, i.e. International Business Machines Corporation of Armonk, N.Y., a list of callers that are able to request an override of a current state of a mobile device is provided any only those callers can enter a command to request an override. While such mechanisms work well, there are some limitations in that the ability to override the current operational state of a mobile device is limited to only those individuals included on the white list and those individuals must manually enter a command to request such an override.

One characteristic of incoming calls that is indicative of a need to override a current operational state of a mobile device, e.g., the mobile device being in a silent mode of operation, is repeated calls incoming from a same caller within a relatively short period of time. That is, if the same caller attempts to contact the user via the user's mobile telephone, for example, 5 times within a 10 minute window of time, this may be indicative of an urgent need for the caller to communicate with the user. Alternatively, in some instances, such repeated attempts to contact a user may be indicative of a nuisance caller. In either case, the detection of such situations may be used as a way of triggering the overriding of a current operational state of the mobile device.

The illustrative embodiments provide mechanisms for handling repetitive incoming calls from a caller within a predetermined period of time. With the mechanisms of the illustrative embodiments, a call log may be maintained within a service provider computing device, within the mobile communication device itself, or the like, that logs communications incoming and outgoing by the mobile communication device. Mechanisms are provided for analyzing the frequency of incoming calls from various sources, i.e. "callers", to determine if a predetermined threshold number of calls within a predetermined period of time have been logged from a same caller. If so, the mechanisms of the illustrative embodiments may operate to modify a notification mode for subsequent incoming calls received from that caller. For example, the notification mode may be escalated or degraded based on identification of this condition being present.

By "escalation" what is meant is that the current notification mode is overridden and a notification is generated that is more likely to be discernible or perceivable by the user of the mobile communication device. For example, if a mobile communication device is currently in a silent mode of operation, i.e. no notifications of incoming calls are generated when an incoming call is received, escalation would cause the mobile communication device to generate some notification, either a vibration notification, audible notification, combination of tactile (e.g., vibration) notification and audible notification, visual notification, or any combination of audible, tactile, and visual notification.

A "degradation" of the notification mode is the opposite of an "escalation" and is the modification of a notification mode of the mobile communication device to make notifications of incoming calls less discernible or perceivable to the user of the wireless communication device. For example, a degradation may change a vibration notification mode of the wireless communication device such that the notification mode used for incoming calls from a particular source of calls is a silent mode of notification, i.e. no notification being output on the mobile communication device.

Whether to perform an escalation or degradation may be based on historical data of previous acceptances or denials of incoming communications from the same source of calls, i.e. the caller. That is, for example, a historical data structure may be maintained that identifies whether the user of the mobile communication device has routinely accepted calls from the caller in the past or has routinely blocked or failed to accept incoming calls from the caller, e.g., the calls are sent to voicemail or otherwise not accepted by the user when the incoming call is received. Based on this historical information, a determination may be made as to whether to escalate notifications, such as in the case where historical information indicates routine acceptance of incoming calls from the caller, or to degrade notifications, such as in the case where historical information indicates routine blocking/non-acceptance of incoming calls from the caller.

The threshold number of incoming calls, the predetermined period of time, as well as other parameters for controlling the modification of the notification mode for a particular caller may be customized for the particular caller. Thus, one caller may have a first threshold number of incoming calls within a first predetermined period of time, while another caller may have a second threshold number of incoming calls within the same first predetermined period of time or a second predetermined time different from the first predetermined period of time. This information may be stored in one or more data structures in a service provider data processing system, the mobile communication device, or the like.

The modification of the notification mode may be performed in a hierarchical fashion such that multiple levels of escalation/degradation are made possible with different thresholds or conditions triggering the different levels of escalation/degradation. For example, if a first threshold number of incoming calls from a particular caller are received within a predetermined period of time, a first change in the notification mode of the mobile communication device may be made (e.g., changing from silent mode to vibration mode of notification for calls received from the caller), and then if a second number of calls from the same caller are received within another period of time subsequent to the first period of time, a second modification of the notification mode to escalate the notification mode even further may be made (e.g., changing from the vibration mode of notification to an audible mode of notification).

Thus, the mechanisms of the illustrative embodiments, as described in greater detail hereafter, provide the ability for the customized setting of notification modes for various callers as well as parameters for escalating/degrading such notification modes based on specified conditions. In this way, a general notification mode of a mobile communication device may be overridden for particular callers and/or particular numbers of calls received from a same caller within a predetermined period of time. As a result, users of mobile communication devices are more likely to be notified of important communications from callers even when the mobile communication devices are place in notification modes where notifications of such communications generally would not be output to the user or otherwise are less likely to be discernible to the user.

Turning now to FIG. 1, an example mobile phone system 100 is depicted that includes mobile phones 110 and 140, mobile phone server(s) 130 and mobile phone service provider(s) 135. Mobile phone system 100 may be a general purpose or specific purpose computer system such as a distributed computing system, supercomputer, high-performance computing system, computing cluster, mainframe computer, client-server system, workstation, server, or other device for establishing and maintaining connections between mobile phones, mobile broadband cards or the like. For example, mobile phones 110 and 140 may register with mobile phone server(s) 130 when powered on. Mobile phone server(s) 130 may verify service contracts for mobile phones 110 and 130 with mobile phone service provider(s) 135. Upon verifying service, mobile phone server(s) 130 may facilitate phone calls to and from mobile phones 110 and 140.

Mobile phone system 100 also optionally includes one or more communication networks 102, such as a wireless communication network, e.g., cellular telephone network, WiFi network, satellite communication network, and/or other packet switched network(s), data network(s), or the like, in communication with mobile phone server(s) 130. For example, one or more data networks (not shown) may be coupled to the mobile phone system 100, such as via a mobile phone server 130 or the like, such that mobile phones 110 and 140 may access data sources via a combination of the mobile phone system 100 and such data network(s) as well as receive communications from data sources on these one or more data network(s). Thus, mobile phones 110 and 140 may operate to handle voice communications, data communications, combinations of voice and data communications, as well as perform other functionality such as may be found in a smart phone as is generally known in the art.

Mobile phone 110 may be any device capable of performing mobile communications. For example, the mobile phone 110 is a mobile communication device, such as a mobile broadband card connected to a computer executing a software ('soft') phone that is adapted to communicate wirelessly via mobile phone system 100, a cellular telephone, a smart phone, a tablet computing device, a touchpad device, such as an IPad™ available from Apple Corporation, or any other type of mobile communication device capable of performing data processing operations. In one embodiment, mobile phone 110 may communicate with a relay station as part of mobile phone server(s) 130, which in turn is in communication with a mobile telephone switching office (MTSO), gateway mobile switching center ("GMSC"), or other elements of a wireless or mobile communication network. In one embodiment, mobile phone server(s) 130 communicate with a telephone network (or other wireless or mobile communication networks) via a GMSC. Mobile phone server(s) 130, in a further embodiment, communicate with the Internet or other network, such as by using the Wireless Access Protocol ("WAP") via a WAP gateway or the like, which translates between the protocols of the World Wide Web (WWW) of the Internet, and the WAP protocols of mobile phone 110.

Mobile phone 110 may receive incoming communications from other communication devices, either wired or wireless, mobile or non-mobile, via one or more of the networks, and may generate notifications of the incoming communications in accordance with the mechanisms of the illustrative embodiments as described hereafter. The mobile phone 110 may generate these notifications using any of a number of output forms generally being of the tactile, visual, or audible types. The mobile phone 110 is equipped with output devices for facilitating such notifications including a speaker, light emitting diodes (LEDs), a liquid crystal display (LCD), vibration motor, or the like. For example, when mobile phone 110 is powered, mobile phone 110 may transmit a registration packet to mobile phone server(s) 130 via transmitter 112.

Upon verification of service, mobile phone server(s) 130 may gather account information from mobile service provider(s) 135. This account information may include settings for the escalation/degradation of notifications on the mobile phone 110 in accordance with the mechanisms of the illustrative embodiments. In such a case, the functions described hereafter for escalating/degrading notification modes of a mobile phone 110 may be entirely or partially performed at the mobile phone server(s) 130, for example, using information stored. In such a case, for example, the mobile service provider 135 may receive incoming calls to the mobile phone 110, determine if conditions are present for modifying a notification mode of the mobile phone 110 for the particular incoming call based on the settings stored by the mobile service provider 135, and then forwarding the call to the mobile phone 110 with an indication as to whether a current notification mode of the mobile phone 110 should be overridden and/or the particular notification mode that should be used by the mobile phone 110 when announcing the incoming call, if any. Alternatively, such settings may be stored locally in the mobile phone 110 where the functionality for determining the notification mode in accordance with the illustrative embodiments may be performed locally in the mobile phone 110.

Mobile phone 110 may receive the incoming call, and in some illustrative embodiments the notification mode settings, via receiver 114. The mobile phone 110 includes output devices 120 for outputting notifications of the incoming call in accordance with the notification settings and overriding of notification modes of the illustrative embodiments. Such notifications may take many different forms, generally of the tactile, visual, and/or audible types. For example, the illumination behind the keys and/or changing the illumination of the display, changing a message, graphical image, or the like on the display, indicating the receipt of an incoming call via one or more audible alerts, and/or indicating the receipt of an incoming call via the turning on of a vibration motor or other tactile mechanism.

Transmitter 112 and receiver 114 may communicate with a transmitter and receiver of mobile phone server(s) 130 via one or more mobile access technologies such as time division multiple access (TDMA), code division multiple access (CDMA), global system for mobile communications (GSM), or the like. TDMA assigns each connection (or call) a portion of time on a designated frequency such as 6.7 milliseconds of a narrow band that is 30 kHz wide and split time-wise into three portions or time-slots. The Electronics Industry Alliance and the Telecommunications Industry Association uses TDMA for Interim Standard 54 (IS-54) and Interim Standard 136 (IS-136).

CDMA gives a unique sequence code to each call and spreads digitized data over the available bandwidth. Multiple calls are overlaid on each other on a channel, with each assigned a unique sequence code. CDMA is a form of spread spectrum, which sends data out over a number of discrete frequencies. GSM implements encryption with a form of TDMA.

Subscriber identity module (SIM) 116 may be a memory to maintain a subscriber identifier and a system identification code (SID) to identify a carrier of mobile phone service provider(s) 135. In some illustrative embodiments, SIM 116 is a smart card roughly the size of a postage stamp that securely stores the key identifying a mobile phone service subscriber, as well as subscription information, saved telephone numbers, preferences, settings, text messages and other information. SIM 116 may store network state information such as its current Location Area identity (LAI). For instance, after mobile phone 110 is turned off and powered on again, mobile phone 110 may retrieve data off SIM 116 to search for the most recent LAI, preferred LAIs, and/or frequently accessed LAIs, advantageously avoiding a search of a list of frequencies in many situations. SIM 116 may be uniquely identified by its international circuit card identification (ICCID).

Some of this data, or additional data, may also be stored in a local memory 115 of the mobile phone 110. The local memory 115 may be a random access memory (RAM), flash memory, or other type of memory generally known in the art that is capable of storing data, executable code, or the like, including settings and executable code for implementing notification escalation/degradation in accordance with the illustrative embodiments. Alternatively, such executable code may be implemented in hardware logic built into the mobile phone 110. For example, in one illustrative embodiment, the functionality for implementing notification escalations/degradations may be hardwired into circuit logic, such as notification mode modification logic 118, of the mobile phone 110.

The notification mode logic 118 of the mobile phone 110 comprises logic for implementing the functionality described herein with regard to modifying or overriding a notification mode setting of the mobile phone 110 in response to an incoming call from a particular caller based on whether conditions for performing such modification or overriding have been met. Notification mode logic 118 may operate to determine a type of notification of an incoming call that should be output by the output devices 120 of the mobile phone based on, for example, a frequency of recent receipt of incoming calls from the particular caller and/or a history of user acceptance/rejection of incoming calls from that caller. The notification may be an escalating or degrading notification type based on multiple different predetermined conditions being met. The notifications may involve displaying a particular type of message, graphical image, a particular type of color of light on an LED, on the display, etc., a particular type or duration of a tactile output, such as a vibration output, and/or a particular type or duration of an audible notification.

For example, upon receipt of an incoming call from a mobile phone 140 at mobile phone server(s) 130, mobile phone server(s) 130 may transmit the SID associated with mobile phone 140, a telephone number associated with the mobile phone 140, or other identification of the mobile phone 140 or the user associated with the mobile phone 140, to mobile phone 110. Notification mode logic 118 may receive the SID, telephone number, or other identifier of the caller mobile phone 140 and may perform operations to determine if a predetermined number of incoming calls from the same SID, telephone number, or other identifier of the caller mobile phone 140 have been received within one or more predetermined time periods and then performing notification mode modification operations based on such a determination.

The mobile phone 110 may further store a call log file 119 in memory 115 or other storage device associated with the mobile phone 110. Upon receiving the identification of a caller of an incoming call to the mobile phone 110, the identification of the caller, e.g., the SID, telephone number, or the like, is stored in the call log file 119 if it is not already present in the call log file. If the SID, telephone number, or the like, is already stored in the call log file 119, then a count of the number of incoming calls received from a caller associated with the SID, telephone number, or the like, within a predetermined time period is incremented. A timestamp associated with the incoming call may also be stored in a list of timestamps for incoming calls received from the caller within the predetermined time period for later processing.

The notification mode logic 118, in response to receiving a SID, telephone number, or other identifier of a caller for an incoming call, may analyze the entry in the call log file 119 corresponding to the SID, telephone number, or other identifier of the caller. The analysis may determine whether the count of the number of incoming calls received from the identified caller within a predetermined time exceeds one or more thresholds. For example, a threshold may be set to 5 incoming calls from the same caller within a 10 minute time period. In such a case, the counter values in the call log file 119 may be reset at the end of each predetermined time period, e.g., every 10 minute time period. Alternatively, if timestamps are stored in association with entries in the call log file 119, then a number of timestamps present in the call log file 119 from a current time backwards in time for a period corresponding to the predetermined time period may be determined and compared to the one or more thresholds, e.g., 5.

If the threshold is met or exceeded, the notification mode logic 118 may modify the notification mode of the mobile phone 110 for subsequent incoming calls from the same caller. Thus, while the mobile phone 110 may be set to a silent mode of notifications of incoming calls, such that no tactile, audible, or visual notification output is generated when calls are received, when a subsequent incoming call from the same caller is received again, or even in response to the current incoming call, a different notification mode is utilized from the generalized notification mode to which the mobile phone 110 is set. For example, if the mobile phone 110 is in a silent mode, the notification output for the current incoming call from the caller, or a subsequent incoming call from the caller, may be set to a vibration mode, audible output mode, visual output mode, or any combination of these for the incoming calls from that caller. Calls from other callers that have not met such conditions, or do not have such conditions associated with them for modifying the notification mode of the mobile phone 110, are subject to the generalized notification mode to which the mobile phone 110 is set, e.g., the silent notification mode.

In response to determination that the one or more thresholds have been met or exceeded by the number of received incoming calls from the caller within the one or more predetermined periods of time, one or more flags may be set in the call log file 119 to identify an override notification mode to be used with the current and/or subsequent incoming calls from the same caller. As a result, the notification mode logic 118, when analyzing the entry in the call log file 119 may identify that these one or more flags are set and as a result, override the general notification mode of the mobile phone 110 and instead control the output devices 120 to generate a notification of the incoming call from the caller corresponding to the override notification mode identified by the set flag(s).

As mentioned above, in one illustrative embodiment, the modification of the notification mode may be performed in a hierarchical manner based on a plurality of thresholds and a plurality of predetermined time periods. Thresholds and time periods may be utilized dependent upon a previous threshold within a previous predetermined time period being met. For example, a first threshold and time period may be set to 5 incoming calls from the caller within a 10 minute period. If such a threshold is met within the specified time period, then a modification of the notification mode may be performed to modify the notification mode to a tactile mode, e.g., vibration output. A second threshold and time period may be 2 incoming calls within a 3 minute time period. Thus, after having first received 5 incoming calls from the caller within a first 10 minute period, if 2 more incoming calls are received within a subsequent 3 minute period, then the notification mode may again be escalated to an audible mode of notification, e.g., output a ring tone or the like. Additional thresholds and time periods may be set along with corresponding additional modifications of the notification mode.

It should be appreciated that while the above illustrative embodiments are described in terms of escalating the notification mode when thresholds are met or exceeded, the mechanisms of the illustrative embodiments may also be used to degrade notification modes. For example, while repeated attempts by a caller to contact a user of a mobile phone 110 may be indicative of an emergency need for the caller to contact the user, in other instances and with other callers, such repeated calls may be indicative of the caller being a nuisance. The user of the mobile phone 110 may establish settings within the local memory 115 to indicate that, for each caller identifier of interest, what the specific thresholds and time periods are (such that different callers may have different thresholds and corresponding time periods), as well as indicators of a corresponding notification mode if the threshold within the specified time period is met or exceeded. In other illustrative embodiments, the settings, rather than specifying a particular notification mode, may indicate whether or not the notification mode should be escalated or degraded when the corresponding threshold within the corresponding time period is met or exceeded. A combination of escalations and degradations may be used with the same caller identifier such that if a first threshold within a first time period is met or exceeded, for example, the notification mode may be escalated, but if a subsequent second threshold within a second time period is exceeded, the notification mode may be degraded, for example.

Thus, for example, a user of the mobile phone 110 may determine that for specified family members, if those family members attempt to contact the user via the mobile phone 110 at least 3 or more times within a 5 minute time window, then their notification mode should be escalated or even set to the highest setting, i.e. a notification mode using all notification types, e.g., tactile, visual, and audible. However, on the other hand, if there is a particular co-worker or acquaintance that tends to call the user with unimportant or unwanted communications, the user may establish a setting for that caller such that if 3 or more incoming calls are received from that caller within a 10 minute window, the notification mode for that caller is degraded or set to a minimum setting, e.g., silent notification mode.

In still other illustrative embodiments, the mobile phone 110 may store a history data structure 117 in local memory 115 that stores a history of recent calls from callers and an indication of whether the call was accepted by the user of the mobile phone 110, rejected by the user of the mobile phone 110, whether a subsequent call to the same caller was made within a predetermined time of a rejected incoming call from the caller, and other historical information indicative of whether the user wishes to communicate with the caller or not. The notification mode logic 118 may analyze this information in the historical data structure 117, either periodically, in response to receipt of an incoming call from a particular caller, or the like, to determine if it is likely that the user of the mobile phone 110 wishes to escalate or degrade the notification mode for the particular caller's incoming call. For example, based on the entries in the history data structure 117 for a particular caller's identifier, e.g., SID, telephone number, etc., the notification mode logic 118 is able to determine a probability that the user will want to communicate with the caller based on the number of incoming calls received from the caller, the number of times the user answered the incoming calls (accepted the incoming calls), the number of times the user rejected or did not answer the incoming calls, the number of times the user returned an incoming call by calling the caller within a predetermined time window of the incoming call, e.g., within 30 minutes of the incoming call, etc. A formula or equation may be established for generating a probability measure based on one or more of these factors, as well as other factors indicative of a likelihood that the user may want to communicate with the caller.

The probability measure that is generated may be compared to one or more predetermined threshold values to determine if the probability is sufficiently high to warrant escalating the notification mode of the mobile phone 110 for incoming calls being received from that caller. If the probability measure is not sufficiently high, e.g., equal to or higher than a first predetermined threshold, then a determination is made as to whether the probability measure is below the same or different threshold that is indicative of a desire to degrade the notification mode of the mobile phone 110. If the probability measure is between the first predetermined threshold, indicative of an escalation of the notification mode, and a second predetermined threshold indicative of a degradation of the notification mode, then the notification mode may remain unchanged. Other functionality and analysis that may be used to determine whether to escalate or degrade a notification mode based on historical call acceptance/rejection and callback information may be used without departing from the spirit and scope of the illustrative embodiments.

Thus, the mechanisms of the illustrative embodiments provide the ability to automatically modify a notification mode of a mobile phone for individual callers based on a frequency of incoming calls from that caller and/or historical information about the acceptance/rejection and callback of calls associated with that caller. Such modifications of the notification mode may be performed in a hierarchical manner. Moreover, the modifications may operate to escalate/degrade notification modes. In addition, the modification of the notification mode may be performed on an individual caller basis such that calls from other callers may be handled with different notification modes, or even a general or default notification mode to which the mobile phone is set.

It should be appreciated that while the above illustrative embodiments have been described in terms of mobile phones since these are fast becoming the prevalent form of telephone communication in our society, the illustrative embodiments are not limited to such. To the contrary, the mechanisms of the illustrative embodiments may be applied to any communication devices and communications that support a functionality where incoming communications are first announced before being accepted/rejected by a user of the communication device. For example, the illustrative embodiments may be utilized with landline telephone devices in which incoming calls may be blocked, ring announcements place in a silent mode, or different ring announcements presented. As a further example, video conferencing software, such as Skype™ (a trademark of Skype Limited Corporation) on one or more computing devices, portable tablet computing devices, or the like, may be used with the mechanisms of the illustrative embodiments such that the mechanisms of the illustrative embodiments may be applied to incoming video conferencing calls or the like.

Figure 2:
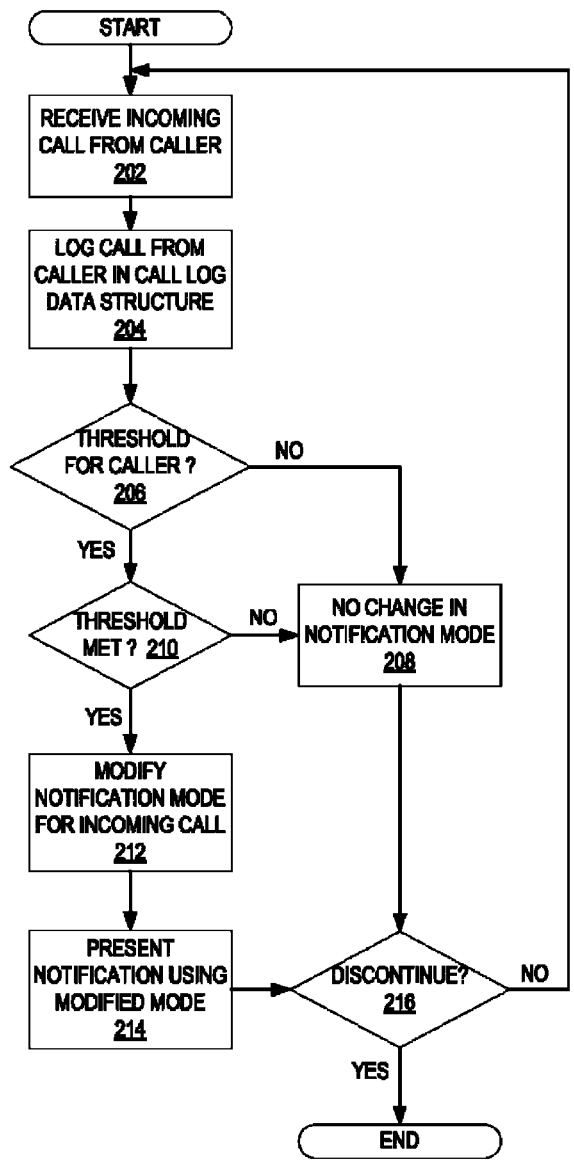
FIG. 2 is an example flowchart outlining an example operation for modifying a notification mode of a mobile telephone system in accordance with one illustrative embodiment.

FIG. 2 is a flowchart outlining an example operation for modifying a notification mode of a communication device in accordance with one illustrative embodiment. In the example of FIG. 2, the communication is a telephone call to a mobile phone. However, as noted above, it should be appreciated that the mechanisms of the illustrative embodiments may be applied to other types of communications as well.

As shown in FIG. 2, the operation starts by receiving an incoming call from a caller (step 202). An entry for the caller is stored in a call log, or an already existing entry in the call log is updated, to reflect the incoming call from the caller (step 204). As discussed above, this may involve storing an identifier of the caller, incrementing a count of the number of calls received from this caller, storing a timestamp of the incoming call from the caller, or the like.

A determination is made as to whether there is at least one notification mode modification threshold value setting for this caller (step 206). That is, not all callers will have notification mode modifications enabled for those callers and thus, if no notification mode modification threshold is set for this caller, then the notification mode of the mobile phone is not changed (step 208). If however, there is at least one notification mode modification threshold value set for this caller, a determination is made as to whether one or more of these thresholds have been met (step 210). If not, the operation again does not modify the notification mode of the mobile phone (step 208).

If one or more notification mode modification threshold values have been set for this caller, and one or more of these thresholds have been met, then the notification mode to be used with the incoming call from the caller, or subsequent incoming calls from the caller, is modified (step 212). Such modification may involve setting the notification mode to a specified different notification mode from what the mobile phone is current set to, escalating the notification mode to a next higher level notification mode in a hierarchy of notification modes, or degrading the notification mode to a next lower level of notification mode in a hierarchy of notification modes, for example. The notification for the current incoming call is then presented using the modified notification mode (step 214) and a determination is made as to whether continued processing using the mechanisms of the illustrative embodiments should continue (step 216). If so, the operation returns to step 202; otherwise, the operation terminates.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
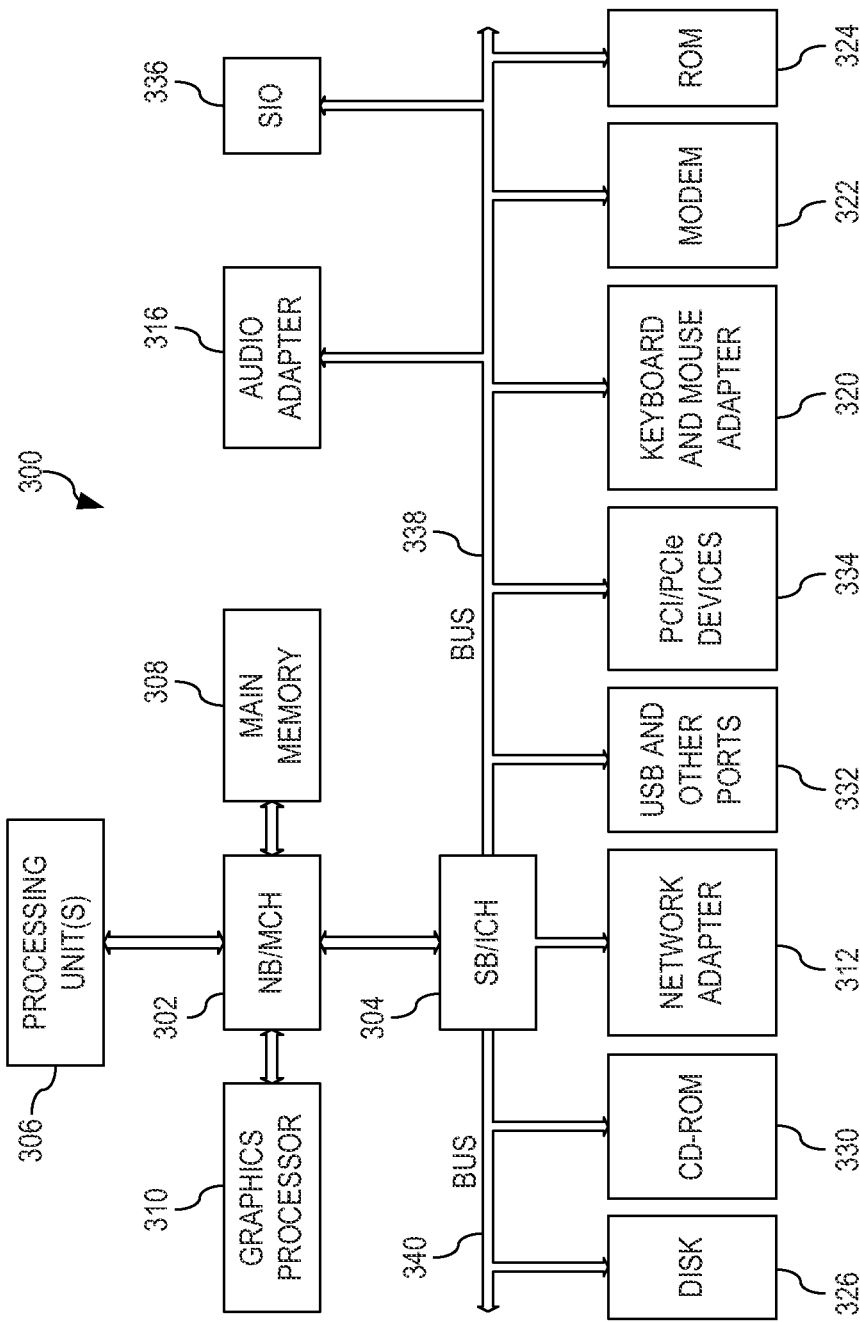
FIG. 3 is an example block diagram of a data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 3 is provided hereafter as an example environment in which aspects of the illustrative embodiments may be implemented. It should be appreciated that FIG. 3 is only an example and is not intended to assert or imply any limitation with regard to the environments in which aspects or embodiments of the present invention may be implemented. Many modifications to the depicted environment may be made without departing from the spirit and scope of the present invention.

FIG. 3 is a block diagram of an example data processing system in which aspects of the illustrative embodiments may be implemented. Data processing system 300 is an example of a computing device, such as a mobile phone 110 in FIG. 1, a portable computing device, desktop computing device, server computing device, or the like, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface, Super I/O (SIO) device 336 may be connected to SB/ICH 304.

An operating system or other control software may run on processing unit 306. For mobile devices, this operating system may be a mobile device operating system such as, for example, an Apple OS, available from Apple Corporation. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System p® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a communication device comprising a processor and a memory, for modifying a notification mode for notifying a user of an incoming communication, comprising:

receiving, in a first communication device, the incoming communication from a second communication device;

determining whether a total number of received incoming communications from the second communication device within a predetermined period of time meets or exceeds a first predetermined threshold;

modifying, in response to the total number of received incoming communications from the second communication device within the predetermined period of time meeting or exceeding the first predetermined threshold, the notification mode of the first communication device to be different from a current notification mode of the first communication device for incoming communications from the second communication device, to thereby generate a modified notification mode, wherein modifying the notification mode of the first communication device to be different from the current notification mode of the first communication device for incoming communications from the second communication device, to thereby generate the modified notification mode comprises:

determining whether to escalate or degrade the notification mode of the first communication device, wherein determining whether to escalate or degrade the notification mode of the first communication device comprises:

analyzing a historical data structure that stores a history of whether received incoming communications from the second communication device have been accepted or rejected by a user of the first communication device; and determining whether to escalate or degrade the notification mode of the first communication device based on results of the analysis of the history data structure, wherein:

in response to the results of the analysis indicating that the user of the first communication device tends to reject received incoming communications from the second communication device, the determination whether to escalate or degrade the notification mode is a determination to degrade the notification mode, and in response to the results of the analysis indicating that the user of the first communication device tends to accept received incoming communications from the second communication device, the determination whether to escalate or degrade the notification mode is a determination to escalate the notification mode; and escalating or degrading the notification mode of the first communication device based on results of the determination as to whether to escalate or degrade the notification mode of the first communication device; and outputting a notification of the incoming communication from the second communication device using the modified notification mode of the first communication device.

2. The method of claim 1, wherein the first communication device is a mobile telephone and wherein the received incoming communication is a telephone call.

3. The method of claim 1, wherein modifying the notification mode of the first communication device comprises modifying the notification mode to be more likely to be perceived by the user of the first communication device.

4. The method of claim 1, wherein modifying the notification mode of the first communication device comprises modifying the notification mode to be less likely to be perceived by the user of the first communication device.

5. The method of claim 1, wherein modifying the notification mode of the first communication device comprises modifying the notification mode to change the notification mode from a silent mode to at least one of a vibration mode, an audible mode, or a visual mode of notification.

6. The method of claim 1, wherein determining whether the total number of received incoming communications from the second communication device within the predetermined period of time meets or exceeds the first predetermined threshold, comprises:

maintaining, in either the first communication device or a separate data processing device, a call log that stores log information about communications received by the first communication device; and analyzing the log information in the call log to determine whether a total number of received incoming communications from a same source communication device within the predetermined period of time meets or exceeds the first predetermined threshold.

7. The method of claim 1, wherein, in response to the total number of received incoming communications from the second communication device within the predetermined period of time meeting or exceeding the first predetermined threshold, the method further comprises:

monitoring subsequent received incoming communications from the second communication device to determine a second total number of subsequent received incoming communications from the second communication device within a second predetermined period of time;

determining whether the second total number of subsequent received incoming communications from the second communication device within the second predetermined period of time meets or exceeds a second threshold; and modifying the modified notification mode to be a second modified notification mode in response to determining that the second total number of subsequent received incoming communications from the second communication device within the second predetermined period of time meets or exceeds the second threshold.

8. The method of claim 1, wherein determining whether the total number of received incoming communications from the second communication device within the predetermined period of time meets or exceeds the first predetermined threshold, comprises:

maintaining a data structure that stores, for a plurality of second communication devices, a corresponding predetermined threshold and a predetermined period of time, wherein each second communication device in the plurality of second communication devices has at least one of a different predetermined threshold or a different predetermined period of time from other second communication devices in the plurality of second communication devices; and retrieving the predetermined period of time and the first predetermined threshold from the data structure based on an identification of the second communication device from which the received incoming communication is received.

9. The method of claim 1, wherein received incoming calls from other third communication devices utilize the current notification mode of the first communication device and only received incoming calls from the second communication device utilize the modified notification mode of the first communication device.

10. A computer program product comprising a computer readable storage medium having a computer readable program stored therein, wherein the computer readable program, when executed on a computing device, causes the computing device to:

receive, in a first communication device, an incoming communication from a second communication device;

determine whether a total number of received incoming communications from the second communication device within a predetermined period of time meets or exceeds a first predetermined threshold;

modify, in response to the total number of received incoming communications from the second communication device within the predetermined period of time meeting or exceeding the first predetermined threshold, a notification mode of the first communication device to be different from a current notification mode of the first communication device for incoming communications from the second communication device, to thereby generate a modified notification mode, wherein the computer readable program causes the computing device to modify the notification mode of the first communication device to be different from the current notification mode of the first communication device for incoming communications from the second communication device, to thereby generate the modified notification mode by:

determining whether to escalate or degrade the notification mode of the first communication device, wherein determining whether to escalate or degrade the notification mode of the first communication device comprises:

analyzing a historical data structure that stores a history of whether received incoming communications from the second communication device have been accepted or rejected a user of the first communication device; and determining whether to escalate or degrade the notification mode of the first communication device based on results of the analysis of the history data structure, wherein:

in response to the results of the analysis indicating that the user of the first communication device tends to reject received incoming communications from the second communication device, the determination whether to escalate or degrade the notification mode is a determination to degrade the notification mode, and in response to the results of the analysis indicating that the user of the first communication device tends to acct received incoming communications from the second communication device, the determination whether to escalate or degrade the notification mode is a determination to escalate the notification mode; and escalating or degrading the notification mode of the first communication device based on results of the determination as to whether to escalate or degrade the notification mode of the first communication device; and output a notification of the incoming communication from the second communication device using the modified notification mode of the first communication device.

11. The computer program product of claim 10, wherein the first communication device is a mobile telephone and wherein the received incoming communication is a telephone call.

12. The computer program product of claim 10, wherein the computer readable program causes the computing device to modify the notification mode of the first communication device by modifying the notification mode to be more likely to be perceived by the user of the first communication device.

13. The computer program product of claim 10, wherein the computer readable program causes the computing device to modify the notification mode of the first communication device by modifying the notification mode to be less likely to be perceived by the user of the first communication device.

14. The computer program product of claim 10, wherein the computer readable program causes the computing device to modify the notification mode of the first communication device by modifying the notification mode to change the notification mode from a silent mode to at least one of a vibration mode, an audible mode, or a visual mode of notification.

15. The computer program product of claim 10, wherein the computer readable program causes the computing device to determine whether the total number of received incoming communications from the second communication device within the predetermined period of time meets or exceeds the first predetermined threshold, by:

maintaining, in either the first communication device or a separate data processing device, a call log that stores log information about communications received by the first communication device; and analyzing the log information in the call log to determine whether a total number of received incoming communications from a same source communication device within the predetermined period of time meets or exceeds the first predetermined threshold.

16. The computer program product of claim 10, wherein, in response to the total number of received incoming communications from the second communication device within the predetermined period of time meeting or exceeding the first predetermined threshold, the computer program product further causes the computing device to:

monitor subsequent received incoming communications from the second communication device to determine a second total number of subsequent received incoming communications from the second communication device within a second predetermined period of time;

determine whether the second total number of subsequent received incoming communications from the second communication device within the second predetermined period of time meets or exceeds a second threshold; and modify the modified notification mode to be a second modified notification mode in response to determining that the second total number of subsequent received incoming communications from the second communication device within the second predetermined period of time meets or exceeds the second threshold.

17. The computer program product of claim 10, wherein the computer readable program causes the computing device to determine whether the total number of received incoming communications from the second communication device within the predetermined period of time meets or exceeds the first predetermined threshold, by:
  maintaining a data structure that stores, for a plurality of second communication devices, a corresponding predetermined threshold and a predetermined period of time, wherein each second communication device in the plurality of second communication devices has at least one of a different predetermined threshold or a different predetermined period of time from other second communication devices in the plurality of second communication devices; and
  retrieving the predetermined period of time and the first predetermined threshold from the data structure based on an identification of the second communication device from which the received incoming communication is received.

18. The computer program product of claim 10, wherein received incoming calls from other third communication devices utilize the current notification mode of the first communication device and only received incoming calls from the second communication device utilize the modified notification mode of the first communication device.

19. A receiver communication device, comprising:
  a processor; and
  a memory coupled to the processor, wherein the memory comprises instructions which, when executed by the processor, cause the processor to:
  receive an incoming communication from a sender communication device;
  determine whether a total number of received incoming communications from the sender communication device within a predetermined period of time meets or exceeds a first predetermined threshold;
  modify, in response to the total number of received incoming communications from the sender communication device within the predetermined period of time meeting or exceeding the first predetermined threshold, a notification mode of the receiver communication device to be different from a current notification mode of the receiver communication device for incoming communications from the sender communication device, to thereby generate a modified notification mode, wherein the instructions cause the processor to modify the notification mode of the first communication device to be different from the current notification mode of the first communication device for incoming communications from the second communication device, to thereby generate the modified notification mode by:
    determining whether to escalate or degrade the notification mode of the first communication device, wherein determining whether to escalate or degrade the notification mode of the first communication device comprises:
      analyzing a historical data structure that stores a history of whether received incoming communications from the second communication device have been accepted or rejected by a user of the first communication device; and
      determining whether to escalate or degrade the notification mode of the first communication device based on results of the analysis of the history data structure, wherein:
        in response to the results of the analysis indicating that the user of the first communication device tends to reject received incoming communications from the second communication device, the determination whether to escalate or degrade the notification mode is a determination to degrade the notification mode, and
        in response to the results of the analysis indicating that the user of the first communication device tends to accept received incoming communications from the second communication device, the determination whether to escalate or degrade the notification mode is a determination to escalate the notification mode; and
    escalating or degrading the notification mode of the first communication device based on results of the determination as to whether to escalate or degrade the notification mode of the first communication device; and
  output a notification of the incoming communication from the sender communication device using the modified notification mode of the receiver communication device.

20. The receiver communication device of claim 19, wherein the receiver communication device is a mobile telephone and wherein the received incoming communication is a telephone call.

21. The receiver communication device of claim 19, wherein the computer readable program causes the computing device to modify the notification mode of the receiver communication device by at least one of:
  modifying the notification mode to be more likely to be perceived by the user of the receiver communication device; or
  modifying the notification mode to be less likely to be perceived by the user of the receiver communication device.

22. The receiver communication device of claim 19, wherein the instructions cause the processor to modify the notification mode of the first communication device by modifying the notification mode to change the notification mode from a silent mode to at least one of a vibration mode, an audible mode, or a visual mode of notification.

23. The receiver communication device of claim 19, wherein the instructions cause the processor to determine whether the total number of received incoming communications from the second communication device within the predetermined period of time meets or exceeds the first predetermined threshold, by:
  maintaining, in either the first communication device or a separate data processing device, a call log that stores log information about communications received by the first communication device; and
  analyzing the log information in the call log to determine whether a total number of received incoming communications from a same source communication device within the predetermined period of time meets or exceeds the first predetermined threshold.

24. The receiver communication device of claim 19, wherein, in response to the total number of received incoming communications from the second communication device within the predetermined period of time meeting or exceeding the first predetermined threshold, the instructions further cause the processor to:
  monitor subsequent received incoming communications from the second communication device to determine a second total number of subsequent received incoming communications from the second communication device within a second predetermined period of time;

determine whether the second total number of subsequent received incoming communications from the second communication device within the second predetermined period of time meets or exceeds a second threshold; and modify the modified notification mode to be a second modified notification mode in response to determining that the second total number of subsequent received incoming communications from the second communication device within the second predetermined period of time meets or exceeds the second threshold.

25. The receiver communication device of claim 19, wherein the instructions cause the processor to determine whether the total number of received incoming communications from the second communication device within the predetermined period of time meets or exceeds the first predetermined threshold, by:

maintaining a data structure that stores, for a plurality of second communication devices, a corresponding predetermined threshold and a predetermined period of time, wherein each second communication device in the plurality of second communication devices has at least one of a different predetermined threshold or a different predetermined period of time from other second communication devices in the plurality of second communication devices; and retrieving the predetermined period of time and the first predetermined threshold from the data structure based on an identification of the second communication device from which the received incoming communication is received.

* * * * *